US008896850B1

(12) United States Patent
Buck et al.

(10) Patent No.: US 8,896,850 B1
(45) Date of Patent: Nov. 25, 2014

(54) WIRELESS MULTIFUNCTION PRINTER WITH FULL FEATURED USER INTERFACE

(71) Applicants: Jonas Buck, Seattle, WA (US); Ferdinand Johannes van Engelen, Bothell, WA (US)

(72) Inventors: Jonas Buck, Seattle, WA (US); Ferdinand Johannes van Engelen, Bothell, WA (US)

(73) Assignee: Girling Kelly Design Group, LLC, Seattle, WA (US)

( * ) Notice: Subject to any disclaimer, the term of this patent is extended or adjusted under 35 U.S.C. 154(b) by 181 days.

(21) Appl. No.: 13/656,655

(22) Filed: Oct. 19, 2012

Related U.S. Application Data

(60) Provisional application No. 61/549,184, filed on Oct. 19, 2011.

(51) Int. Cl.
*H04N 5/225* (2006.01)
*G06F 3/12* (2006.01)
*B41J 29/02* (2006.01)
*B41J 3/36* (2006.01)
*H04N 1/00* (2006.01)

(52) U.S. Cl.
CPC .................................. *H04N 1/00519* (2013.01)
USPC ............................................ 358/1.1; 399/130

(58) Field of Classification Search
CPC ............... B41J 3/46; B41J 29/023; B41J 3/36
See application file for complete search history.

(56) References Cited

U.S. PATENT DOCUMENTS

| 6,270,271 B1 * | 8/2001 | Fujiwara ........................ 400/693 |
| 2002/0039141 A1 * | 4/2002 | Washisu et al. ............... 348/232 |
| 2003/0052956 A1 * | 3/2003 | Katsuyama ................... 347/108 |
| 2005/0157332 A1 * | 7/2005 | Han et al. ...................... 358/1.15 |
| 2007/0133014 A1 * | 6/2007 | Lee ................................ 358/1.1 |
| 2009/0002746 A1 * | 1/2009 | Niwa et al. .................... 358/1.15 |
| 2011/0075220 A1 * | 3/2011 | Chiba ............................ 358/2.1 |

FOREIGN PATENT DOCUMENTS

JP  2004351872 A  * 12/2004  ............... B41J 29/42

OTHER PUBLICATIONS

Miyasaka, Noriaki JP2004351872 A, Dec. 2004 English Machine Language Translation (EMLT).*

* cited by examiner

*Primary Examiner* — Marivelisse Santiago Cordero
*Assistant Examiner* — Daryl Jackson
(74) *Attorney, Agent, or Firm* — Patrick J. S. Inouye; Leonid Kisselev

(57) ABSTRACT

A multifunctional printer is provided. A printer chassis includes a data buffer, controller and printing assembly. The data buffer includes electronic memory storage and retrieval components. The controller is electronically interfaced with the data buffer. The controller is configured to store a digital image into the data buffer. A printing assembly is electronically interfaced with the data buffer. The printing assembly is configured to output a printed facsimile of the digital image under control of the controller in a marking material progressively deposited on a print medium. A display is provided on the chassis and is electronically interfaced with the data buffer. The display is configured to render a visualization of the digital image. The rendering of the visualization on the display excludes that portion of the digital image that has been output in the printed facsimile.

19 Claims, 4 Drawing Sheets

WIRELESS MULTIFUNCTION PRINTER WITH FULL FEATURED USER INTERFACE

CROSS-REFERENCE TO RELATED APPLICATION

This non-provisional patent application claims priority under 35 U.S.C. §119(e) to U.S. Provisional Patent Application Ser. No. 61/549,184 filed Oct. 19, 2011, the disclosure of which is incorporated by reference.

FIELD

This application relates in general to printers, and in particular, to a wireless multifunction printer with full featured user interface.

BACKGROUND

Historically, computer printers began as a straight-forward solution to the problem of how best to transfer electronically stored data into paper form. Prior to the widespread adoption of the personal computer, most computer printers were large industrial devices found only in computing centers that were intended for executing print jobs off mainframe computers. These devices were typically high-speed impact or line printers that printed one line of text at a time. As well, they used fixed font character type to print text only, usually on fan-fold paper perforated along the margins that allowed feeding of the paper through the printer. Then, beginning in the early 1980s, personal computing came into vogue and computer printers evolved into desktop and sometimes portable printers using dot matrix, ink jet, and, to a lesser degree, text-only daisy wheel print technologies. A few years later, laser printers began entering the mass market.

Over the ensuing years, personal printing technology matured and came to embrace both color and monochrome output on many forms of hardcopy media besides traditional paper. Today, computer printers are widely available using a wide range of printing technologies, including liquid and solid ink, toner, dye-sublimation, and inkless. These printers can often be connected through numerous standardized interfaces, whether wired or wireless, and can be dedicated to a single computer, or shared collaboratively over a computer network.

Despite the progress made, computer printers throughout their evolution have remained an adjunct to the computer to which they are connected. The heavy lifting needed to prepare the electronic data for printing, whether word processing, desktop publishing, computer-aided design, graphics or photo editing, and so on, is invariably centered on applications running on the computer, and all user interactions on how the printed output ultimately looks are via the computer's (or increasingly other device's, such as phones and tablets) user interface by which printer operational parameters are set.

The result has been that computer printers are still primarily an accessory that serves the purpose of outputting hardcopy and remain passive participants in the transformation of the electronic data progenitor to that output. Some printer manufacturers have focused on adding additional features and capabilities to their printers; however, the problems and issues that users have with printers seldom pertain to a lack of features. Rather, their dissatisfaction usually has to do with the basic operation of their printers. In particular, the user interface for printers is often a reason for frustration, including the lack of predictability about what the printed image will look like, as a direct result of the printers being considered output-only devices that are disconnected from the end-to-end process of transforming electronically-stored data into some form of hardcopy output.

Thus, there remains a need for providing a printer that can be used with a computer (and other devices), yet which incorporates an user interface that provides more than simply control over print-specific operational parameters and which holistically participates in the printing process.

SUMMARY

One embodiment provides a printer that can be used with a computer (and other devices) with a wireless interface and paper scanning capabilities. The printer includes a full-featured user interface with the following components:
  Printer mechanism, including paper tray, paper feed and ink cartridges.
  Scanner mechanism, including the option for scanning single images or multiple images using a document feeder.
  A full-sized touch screen display with a custom user interface.
  Wireless transceiver to enable wireless transfer of documents and images.
  A unique articulated paper tray to receive printed paper.

One embodiment provides a multifunctional printer. A printer chassis includes a data buffer, controller and printing assembly. The data buffer includes electronic memory storage and retrieval components. The controller is electronically interfaced with the data buffer. The controller is configured to store a digital image into the data buffer. A printing assembly is electronically interfaced with the data buffer. The printing assembly is configured to output a printed facsimile of the digital image under control of the controller in a marking material progressively deposited on a print medium. A display is provided on the chassis and is electronically interfaced with the data buffer. The display is configured to render a visualization of the digital image. The rendering of the visualization on the display excludes that portion of the digital image that has been output in the printed facsimile.

A further embodiment provides a multifunctional printer with foldable print tray. A printer chassis includes a controller, printing assembly, and bi-folded receiving tray. The controller is electronically interfaced with a data buffer and is housed within the chassis. The data buffer includes electronic memory storage and retrieval components. The controller is configured to store a digital image into the data buffer upon receipt from an external data source. The printing assembly is housed within the chassis and is electronically interfaced with the data buffer. The printing assembly is configured to output a printed facsimile of the digital image under control of the controller in permanently fixable pigments progressively deposited on a print medium. The bi-folded receiving tray includes a longitudinally flexible extension pivotably attached to the printer chassis and is operable in an extended orientation to receive the printed facsimile upon output from the printing assembly. A display is included on the chassis and electronically interfaced with the data buffer. The display is configured to render a full-scale visualization of the digital image. The rendering of the visualization on the display excludes that portion of the digital image that has been output in the printed facsimile.

A further embodiment provides a multifunctional user-operable printer with foldable print tray. A printer chassis includes a controller, printing assembly, and bi-folded receiving tray. The controller is electronically interfaced with a data buffer and is housed within the chassis. The data buffer includes electronic memory storage and retrieval components. The controller is configured to store a digital image into the data buffer upon receipt from an external data source. A printing assembly is housed within the chassis and is electronically interfaced with the data buffer. The printing assembly is configured to output a printed facsimile of the digital image under control of the controller in permanently fixable pigments progressively deposited on a print medium. The bi-folded receiving tray includes a longitudinally flexible extension pivotably attached to the printer chassis and is operable in an extended orientation to receive the printed facsimile upon output from the printing assembly. A display is included on the chassis and is electronically interfaced with the data buffer. User-operable editing controls are integrated into the display and are operable to provide a preview of the digital image to retrieve the digital image from the data buffer and render a full-scale visualization of the digital image on the display. The rendering of the visualization on the display excludes that portion of the digital image that has been output in the printed facsimile.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
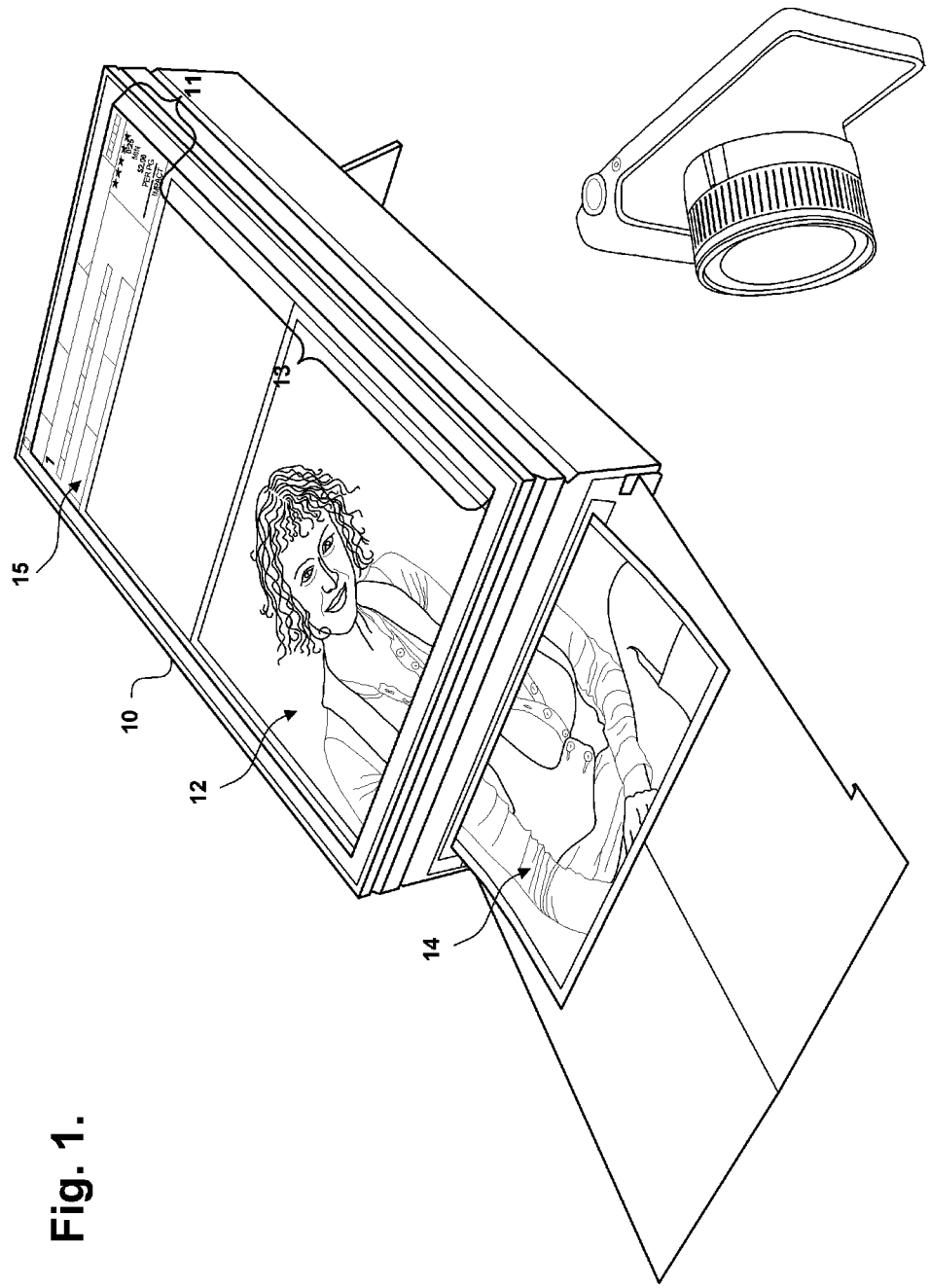
FIG. 1 is a diagram showing a wireless multifunction printer with full featured user interface in accordance with one embodiment.

A wireless multifunction printer incorporates a user interface that enables the user to holistically participate in the printing process. FIG. 1 is a diagram showing a wireless multifunction printer 10 with full featured user interface 11 in accordance with one embodiment. In use, the printer 10 provides simple, user-friendly operation by displaying a full-sized, full-color preview 12 of the image 14 to be printed. When printing the page, transitions from the display 13 to the printed image 14 are shown to indicate printing progress, thereby creating a semantic connection between the digital preview 12 and the printed image 14 of the document.

The full-featured user interface 11 enables users to directly manipulate the image 14 through the touch screen display 13. The user experiences true "what you see is what you get" printing. The image visualized by the printer 10 is substantially identical to the image output by the printer onto a printing medium, such as paper. Built-in on-printer controls 15 facilitate simple and intuitive user interfacing, as further described below with reference to FIG. 2. The scanning interface (not shown) also features a one-to-one, "what you see is what you get" form of operation analogous to the printing features. Also, the physical aspects of the printer 10 that provide access to the scanner, ink cartridges, and paper are simple and straightforward.

The printer 10 uses page-wide, full-width print head technology, such as licensed by Memjet Wide Format, Inc., San Diego, Calif. Rather than using a print technology based on a moving nozzle, this technology uses multiple ink nozzles and eliminates the need for a mechanism to shuttle a print head back and forth across the page. Full-width print head technology results in a much greater printing speed and, more importantly, enables the printer 10 to be only slightly wider than a standard 8½"×11" sheet of paper.

A user is also able to scan in documents in two ways. First, the user can open the scanner lid and place a document, image or book directly on the scanning glass and initiate a scan. Alternatively, the user can open the paper tray lid and place a stack of documents in a secondary paper tray for automatic scanning, as further described below with reference to FIG. 3. Documents loaded into the secondary paper tray are automatically scanned and deposited into the external receiving paper tray.

In one embodiment, the printer 10 can be connected to an external device through a wireless interface (not shown), such as WiFi or Bluetooth. The wireless interface allows users to connect to external device of their choice, including personal computers, network devices, on-line sources, such as Facebook, Picasa, Flickr, and so forth. The printer 10 can also detect standalone WiFi-enabled devices, such as cameras and mobile telephones, and initiate transfer directly from those devices. When scanning documents, data is transferred in the opposite direction, that is, from the printer 10 to the external device. Other external devices are possible.

The printer 10 includes a chassis, which houses a data buffer (not shown) that includes electronic memory storage and retrieval components. The data buffer can store the images that are displayed and printed on the image. The chassis also houses a controller, which can be a processor, which is interfaced to the data buffer. The controller stores a digital image into the data buffer, and to run code executable as software modules.

Figure 2:
FIG. 2 is a diagram showing a detail view of the full featured user interface of the wireless multifunction printer of FIG. 1.

The printer 10 has a full screen color liquid crystal display 13 with a touch screen user interface 11. FIG. 2 is a diagram showing a detail view of the full featured user interface 11 of the wireless multifunction printer 10 of FIG. 1. The display 13 visualizes and presents a full-sized full-color preview 12 of the image 14 that is about to be printed. The preview 12 adjusts based on quality settings and paper selection. The user can edit the outputted image 14, including text-based documents, images, Web content, and so forth, prior to printing and can adjust output parameters, including scale, rotate, crop, color, hue, saturation, margins, and so on, through a simple touch interface. In addition, when scanning documents, the user is able to edit and manipulate files before they are saved. For instance, a user can select a portion of a scanned document to be included or excluded and can composite parts of multiple scanned sources into a single saved document or file. The commands received through the user interfaced are implemented by software modules executable by the controller.

Figure 3:
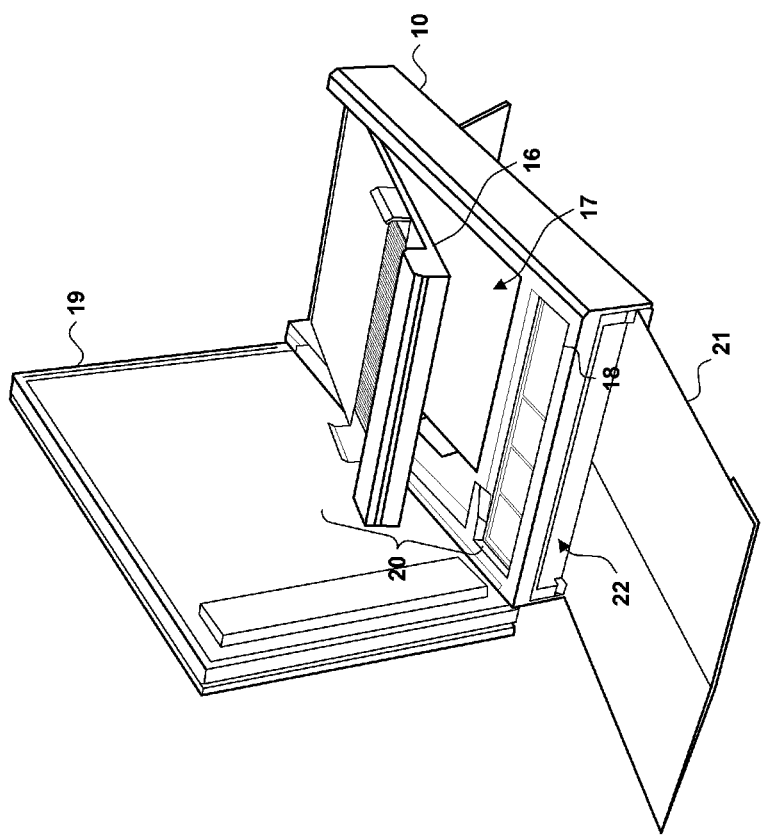
FIG. 3 is a diagram showing the wireless multifunction printer of FIG. 1 with paper supply access.

The printer 10 incorporates easy ink cartridge servicing and flexible paper handling options. FIG. 3 is a diagram showing the wireless multifunction printer 10 of FIG. 1 with paper supply access. Opening the paper tray lid 19 exposes both the paper supply 20 and ink cartridges 18. An empty ink cartridge 18 can be released by pressing on the cartridge body, which causes the ink cartridge 18 to pop up for removal and replacement. Additionally, there are two paper trays inside the printer 10. The bottom paper tray 17 is used to hold the primary paper supply. In one embodiment, the bottom paper tray 17 can accommodate standard letter (8½"×11") and legal (8½"×11") paper sizes, as well as various smaller photo formats (3"×5", 4"×6", and so on). The secondary top tray 16 can accommodate the same sizes of paper as the bottom paper tray 17 and enables the user to store two different types of paper. The top tray 16 is also used as the input tray for document scanning.

A status menu of the user interface 11 includes a 1:1 view of the paper printing supplies, including the loaded ink, or other marking material, cartridges 18 and the inserted paper types. Information on fill levels of the paper and ink cartridges supply, as well as paper type, is displayed on top of the image 14 of the page to be printed. In one embodiment, the paper type can be detected through an invisible code on the paper that is being scanned. The amount of paper is estimated through a small sensor measuring the paper's weight. Other manner of gauging paper type and fill are possible.

The printer 10 includes a unique articulated paper receiving tray 21. In one embodiment, the tray 21 is constructed using four stiff metal or plastic plates, covered on the inside by a fabric or other flexible sheet material. The geometry is such that the tray 21 can fold across the two seams: the tray 21 can fold front-to-back and side-to-side. By not allowing the tray 21 to open to a complete flat position, stiffness in one direction is created to prevent the otherwise flexible hinge from over-extending. When the tray 21 is unfolded and opened, the tray 21 extends out in front of the paper exit slot 22 on the printer 10. The opened tray 21 forms a slight 'V' shape, which creates a structurally stiff tray that can receive paper being printed. In addition, the tray 21 integrates a switch that powers up the printer 10 when the tray 21 is opened and powers down the printer 10 when the tray 21 is closed.

Figure 4:
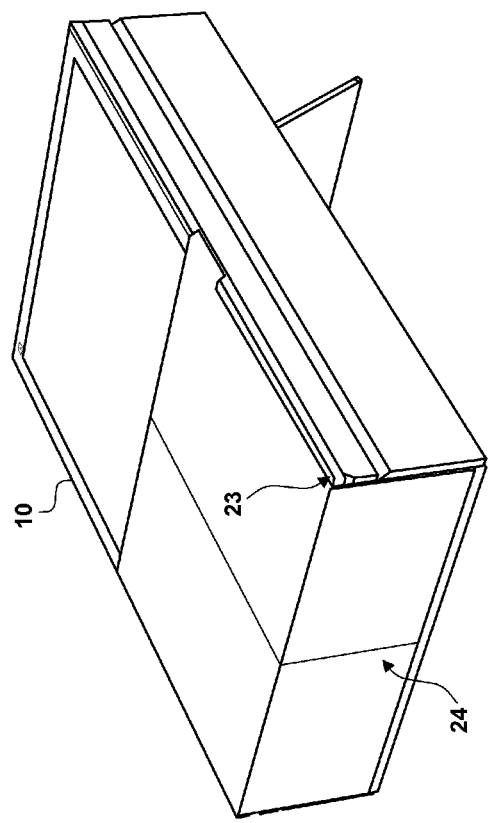
FIG. 4 is a diagram showing the wireless multifunction printer of FIG. 1 with paper receiving tray folded for compact stowage.

The bi-folded structure of the paper receiving tray 21 also facilitates printer stowability. FIG. 4 is a diagram showing the wireless multifunction printer 10 of FIG. 1 with paper receiving tray 21 folded for compact storage. The tray 21 can be folded up compactly across the front and top part 22 of the printer 10. The side-to-side seam 23 enables the tray 21 to wrap back over the front and top part of the printer 10. Additionally, creasing the side-to-side seam 23 flattens the tray 21 along the front-to-back seam 24.

To summarize, the printer 10 provides the following features:
 Full-scale, one-to-one preview 12 of the printed image 14.
 Built-in editing controls for the preview 12 of the printed image 14.
 Touch-based interaction to edit, scale, rotate, and perform other operations on the preview 12 of the printed image 14
 Impact indicator that shows the impact of paper and quality settings on the printed image 14. For example, printing at higher quality level increases the cost of the printing job.
 Using the paper receiving tray 21 to turn the printer 10 on or off.
 Constructing a bi-folded paper receiving tray 21 to create a tray that is flexible in certain orientations, and rigid in others.
 Detecting the amount and type of the paper supply 20.
 Providing a full-sized view of the paper printing supplies.

While the invention has been particularly shown and described as referenced to the embodiments thereof, those skilled in the art will understand that the foregoing and other changes in form and detail may be made therein without departing from the spirit and scope.

What is claimed is:

1. A multifunctional printer, comprising:
 a printer chassis, comprising:
  a data buffer housed within the chassis and comprising electronic memory storage and retrieval components;
  a controller housed within the chassis and electronically interfaced with the data buffer, the controller configured to store a digital image into the data buffer; and
  a printing assembly also housed within the chassis and electronically interfaced with the data buffer, the printing assembly configured to output a printed facsimile of the digital image under control of the controller in a marking material progressively deposited on a print medium;
 an unfoldable paper tray rotatably attached to the chassis and shaped to receive the printed facsimile rendered on the print medium, comprising:
  a frame formed by four stiff plates;
  a flexible material covering at least one surface of the plates; and
  a seam longitudinally comprised in the frame along which the plates form a groove in the frame when the frame is fully extended, which causes a tightening of the flexible material; and
 a display comprised on the chassis and electronically interfaced with the data buffer, the display configured to render a visualization of the digital image,
 wherein the rendering of the visualization on the display excludes that portion of the digital image that has been output in the printed facsimile.

2. A multifunction printer according to claim 1, further comprising:
 a touch-screen user interface comprised with the display, comprising:
  at least one touch-sensitive control; and
  a software module executable by the controller and configured to change the rendering of the visualization upon receipt of a user command by the touch-sensitive control.

3. A multifunction printer according to claim 2, further comprising:
 the touch-sensitive control being selected from the group comprising color, hue, saturation, margins, scale, rotation, and cropping control.

4. A multifunction printer according to claim 1, further comprising:
 a wireless transceiver interfaced with the controller and configured to receive the digital image into the data buffer.

5. A multifunction printer according to claim 1, further comprising:
 a scanner interfaced with the controller and configured to generate and store a scanned image as the digital image into the data buffer.

6. A multifunction printer according to claim 1, wherein a size and a color of the rendering of the visualization are substantially identical to a size and a color of the rendering of the printed facsimile.

7. A multifunction printer according to claim 1, further comprising:

a paper scanner interfaced to the display and configured to render on the display at least one of a type of the print medium and an amount of the print medium in the printing assembly; and a cartridge scanner interfaced to the display and configured to render on the display a level of the marking material in a cartridge comprised in the printing assembly.

8. A multifunction printer according to claim 1, further comprising:

a switch comprised in the paper tray and configured to power up the printing assembly, the buffer, and the display upon an unfolding of the paper tray.

9. A multifunction printer according to claim 1, further comprising:

the frame being foldable along another seam horizontally comprised in the frame.

10. A multifunctional printer with foldable print tray, comprising:

a printer chassis, comprising:

a controller electronically interfaced with a data buffer and housed within the chassis, the data buffer comprising electronic memory storage and retrieval components, the controller configured to store a digital image into the data buffer upon receipt from an external data source; and a printing assembly housed within the chassis and electronically interfaced with the data buffer, the printing assembly configured to output a printed facsimile of the digital image under control of the controller in permanently fixable pigments progressively deposited on a print medium;

an unfoldable paper tray rotatably attached to the printer chassis and shaped to receive the printed facsimile rendered on the print medium, comprising:

a frame formed by four stiff plates;

a flexible material covering at least one surface of the plates; and a seam longitudinally comprised in the frame along which the plates form a groove in the frame when the frame is fully extended, which causes a tightening of the flexible material; and a display comprised on the chassis and electronically interfaced with the data buffer, the display configured to render a full-scale visualization of the digital image, wherein the rendering of the visualization on the display excludes that portion of the digital image that has been output in the printed facsimile.

11. A multifunction printer according to claim 10, further comprising:

a power control switch integral to the tray and operable to trigger operation of the controller upon extension of the tray.

12. A multifunction printer according to claim 10, further comprising:

a plurality of the touch-sensitive controls interfaced with the display and operable to control one or more of the color, hue, saturation, margins, scale, rotation, and cropping of the visualization under control of the controller.

13. A multifunction printer according to claim 10, further comprising:

a wireless transceiver interfaced with the controller and configured to receive the digital image from the external data source into the data buffer.

14. A multifunction printer according to claim 10, further comprising:

a scanner interfaced housed within the chassis and interfaced with the controller, the scanner configured to generate and store a scanned image as the digital image into the data buffer.

15. A multifunctional user-operable printer with foldable print tray, comprising:

a printer chassis, comprising:

a controller electronically interfaced with a data buffer and housed within the chassis, the data buffer comprising electronic memory storage and retrieval components, the controller configured to store a digital image into the data buffer upon receipt from an external data source; and a printing assembly housed within the chassis and electronically interfaced with the data buffer, the printing assembly configured to output a printed facsimile of the digital image under control of the controller in permanently fixable pigments progressively deposited on a print medium;

an unfoldable paper tray rotatably attached to the chassis and shaped to receive the printed facsimile rendered on the print medium, comprising:

a frame formed by four stiff plates;

a flexible material covering at least one surface of the plates; and a seam longitudinally comprised in the frame along which the plates form a groove in the frame when the frame is fully extended, which causes a tightening of the flexible material;

a display comprised on the chassis and electronically interfaced with the data buffer; and user-operable editing controls integrated into the display and operable to provide a preview of the digital image to retrieve the digital image from the data buffer and render a full-scale visualization of the digital image on the display, wherein the rendering of the visualization on the display excludes that portion of the digital image that has been output in the printed facsimile.

16. A multifunction printer according to claim 15, further comprising:

a power control switch integral to the tray and operable to trigger operation of the controller upon extension of the tray.

17. A multifunction printer according to claim 15, wherein the editing controls are operable to control one or more of the color, hue, saturation, margins, scale, rotation, and cropping of the visualization under control of the controller.

18. A multifunction printer according to claim 15, further comprising:

a wireless transceiver interfaced with the controller and configured to receive the digital image from the external data source into the data buffer.

19. A multifunction printer according to claim 15, further comprising:

a scanner interfaced housed within the chassis and interfaced with the controller, the scanner configured to generate and store a scanned image as the digital image into the data buffer.

* * * * *